Figures 1, 2, 3:
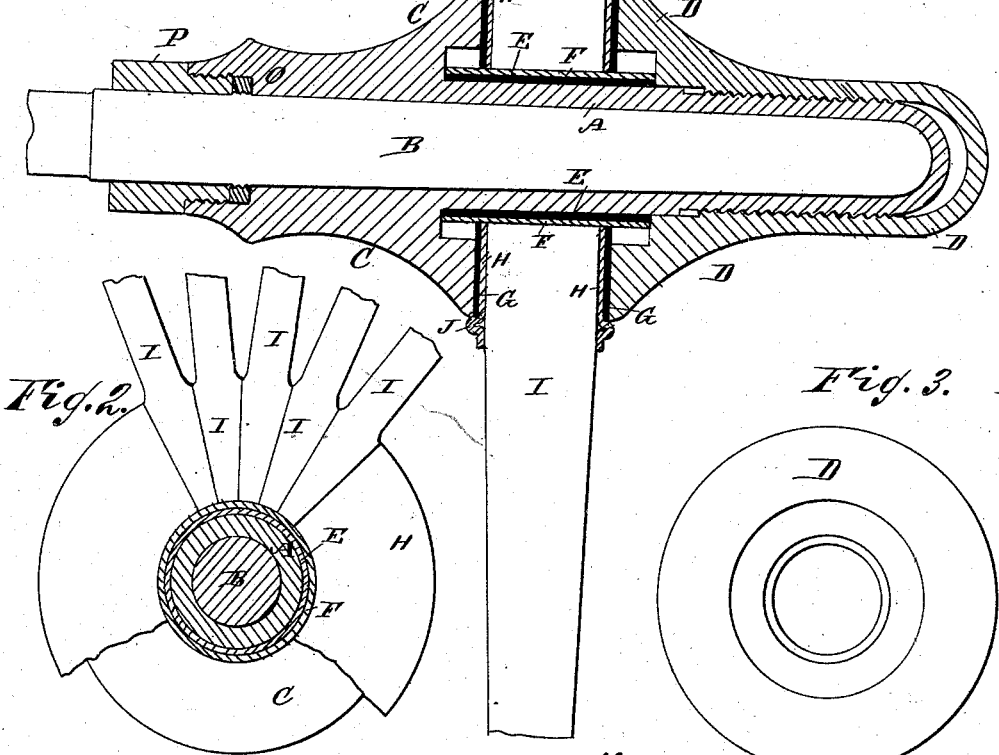

(No Model.)

C. DRAULY.
VEHICLE WHEEL.

No. 265,040. Patented Sept. 26, 1882.

WITNESSES:
Theo. G. Hoster
C. Sedgwick

INVENTOR:
C. Drauly
BY Munn & Co.
ATTORNEYS.

N. PETERS. Photo-Lithographer, Washington, D. C.

UNITED STATES PATENT OFFICE.

CHARLES DRAULY, OF CARRIZO SPRINGS, TEXAS, ASSIGNOR TO HIMSELF, AND TOM DEATS, JOSEPH CHAPMAN, AND F. VANDERVOORT, ALL OF DIMMIT COUNTY, TEXAS.

VEHICLE-WHEEL.

SPECIFICATION forming part of Letters Patent No. 265,040, dated September 26, 1882.

Application filed June 22, 1882. (No model.)

*To all whom it may concern:*

Be it known that I, CHARLES DRAULY, of Carrizo Springs, in the county of Dimmit and State of Texas, have invented a new and Improved Wheel, of which the following is a full, clear, and exact description.

The object of my invention is to provide a new and improved wheel composed of sections which can conveniently be taken apart for transportation and united for use.

The invention consists of a hub formed of a tube provided with an annular shoulder, and having its outer end threaded, on which threaded end a nut is screwed, between the wider inner end of which nut and the shoulder of the tube the inner ends of the spokes are clamped, cushion bands and rings and metal bands and rings being interposed between the ends and sides of the spokes and the tube, its shoulder, and the inner end of the nut.

The invention further consists in a rim formed of sheet metal bent or folded to form a head and web of double thickness, which web is provided with sockets for the outer ends of the spokes.

The invention also consists in certain parts and combinations of the same, as will be fully described hereinafter.

Reference is to be had to the accompanying drawings, forming part of this specification, in which similar letters of reference indicate corresponding parts in all the figures.

Figure 1 is a longitudinal sectional elevation of my improved wheel. Fig. 2 is a cross-sectional elevation of the same, parts being broken out. Fig. 3 is a rear elevation of the hub.

The hub is formed of a tube, A, adapted to receive the axle B, and provided with an annular shoulder, C, the outer end part of this tube A being externally threaded to adapt screwing thereon an internally-threaded nut, D, provided with an enlarged inner end. A cushion-layer, E, of rubber is placed around the tube A, adjoining the shoulder C, and this cushion-layer E is surrounded by a layer, F, of sheet metal, upon which the lower or inner end surfaces of spokes I rest, the inner ends of these spokes being formed wedge-shaped, and the beveled sides of the spokes resting against each other, as shown, so that there will be no spaces between the beveled surfaces of the spokes. A flat rubber cushion-ring, G, is placed against the end surfaces of the shoulder C, and against the inner end surface of the nut D, and over these cushion-rings G flat metal rings H are placed, which metal rings H rest against the sides of the beveled or wedge-shaped parts of the spokes. These metal rings H are provided with external annular ridges, J, which project over the outer circular edges of the cushion-rings G, as shown in Fig. 1. By screwing the nut D up tightly the inner ends of the spokes I will be pressed firmly and clamped between the shoulder C and the inner end of the nut D, and will thus be held in place. The rim K is made T-shaped in cross-section, and is formed of composition sheet metal, which is bent to form a flat head, K', of double thickness, and a web, K², projecting from the inner surface of the rim, and also of double thickness, which thicknesses of the web are united by rivets or bolts L, suitably spaced. At suitable intervals the two thicknesses of this web K² are separated to form sockets Q to receive the cylindrical ends M of the spokes I. A tire, N, which is slightly curved in cross-section, is shrunk on the rim K. The rear end of the hub is provided with a threaded recess, and the inner end of this recess rests against a washer-collar, O, screwed on the axle, and a nut, P, is screwed into this recess, so that the washer-collar O will be between the nut P and the hub, as shown in Fig. 2. The front end of the tube A is closed to form a receptacle for the lubricant. The hub, washer, rim, &c., are made of composition of metal that will not bend, break, or rust. The cushions at the sides of the wheel permit the wheel to give, in place of starting or cracking any part of it.

Having thus fully described my invention, what I claim as new, and desire to secure by Letters Patent, is—

1. In a wheel, the combination, with the screw-threaded tube A, provided with an annular shoulder, C, of the screw-threaded sleeve D, having its inner end flared coincidently with the shoulder C and closed at its outer end, said inclosure being cast or formed integral with the sleeve, substantially as shown and described, and for the purpose set forth.

2. In a wheel, the combination, with the tube A, provided with an annular shoulder, C, of the spokes I, the cushion-layer E, the metal layer F on the same, and the nut D, substantially as herein shown and described, and for the purpose set forth.

3. In a wheel, the combination, with the tube A, provided with an annular shoulder, C, of the spokes I, the cushion-layer E, the metal layer F, the flat cushion-rings G, the flat metal rings H, and the nut D, substantially as herein shown and described, and for the purpose set forth.

4. In a wheel, the combination, with the tube A, provided with an annular shoulder, C, of the spokes I, the cushion-layer E, the metal layer F, the flat cushion-rings G, and the flat metal rings H, provided with an external annular ridge, J, substantially as herein shown and described, and for the purpose set forth.

5. In a wheel, the combination, with the tube A, provided with an annular shoulder, C, and having its outer end closed, of the spokes I and the nut D, substantially as herein shown and described, and for the purpose set forth.

6. In a wheel, a rim made of sheet metal folded to form a head of double thickness and a web of double thickness, substantially as herein shown and described, and for the purpose set forth.

7. In a wheel, the combination, with the hub and spokes, of a rim made of sheet metal folded to form a head of double thickness and a web of double thickness, and sockets in this web for the outer ends of the spokes, substantially as herein shown and described, and for the purpose set forth.

CHARLES DRAULY.

Witnesses:
JAMES M. ELLEDGES,
JAMES M. DAVIS.